May 2, 1967  KOJI SHO  3,317,270
SHUTTER RELEASE DEVICE FOR CINE CAMERAS
Filed Aug. 12, 1964  2 Sheets-Sheet 1

INVENTOR.
KOJI SHO
BY
ATTORNEY 3,317,270
SHUTTER RELEASE DEVICE FOR CINE
CAMERAS
Koji Sho, Yokohama-shi, Japan, assignor to Nippon
Kogaku K.K., Tokyo, Japan, a corporation of Japan
Filed Aug. 12, 1964, Ser. No. 389,168
Claims priority, application Japan, Sept. 3, 1963,
38/46,395
6 Claims. (Cl. 352—141)

This invention relates to automatic exposure mechanisms for motion picture cameras.

It is known in cine cameras to connect a prime mover for shutter rotation and film feed to an electrical generator for conversion of rotational to electrical energy which may be utilized as the source for an automatic exposure adjustment device. In conventional devices of such type, it is mechanically impossible to measure the exposure conditions prior to film feed since the exposure adjustment device does not operate except during the time the prime mover is being rotated to feed film.

An object of the present invention is to remove such disadvantages while enabling measurement of the exposure conditions before actual picture taking is begun. The novel feature of the invention consists in a two-stage action of the push button for releasing the shutter, the prime mover being rotated in the first stage to secure the necessary electrical energy for the exposure adjustment and then in second stage coupling rotation of the prime mover to the film feed.

The invention will be described in detail as below with reference being made to an illustrative embodiment of the invention shown in the drawing in which:

FIG. 4, the same when the release lever closes the switch in the first stage; and FIG. 5, those of the second stage when the clutch disc engages without opening the switch.

Figure 1:
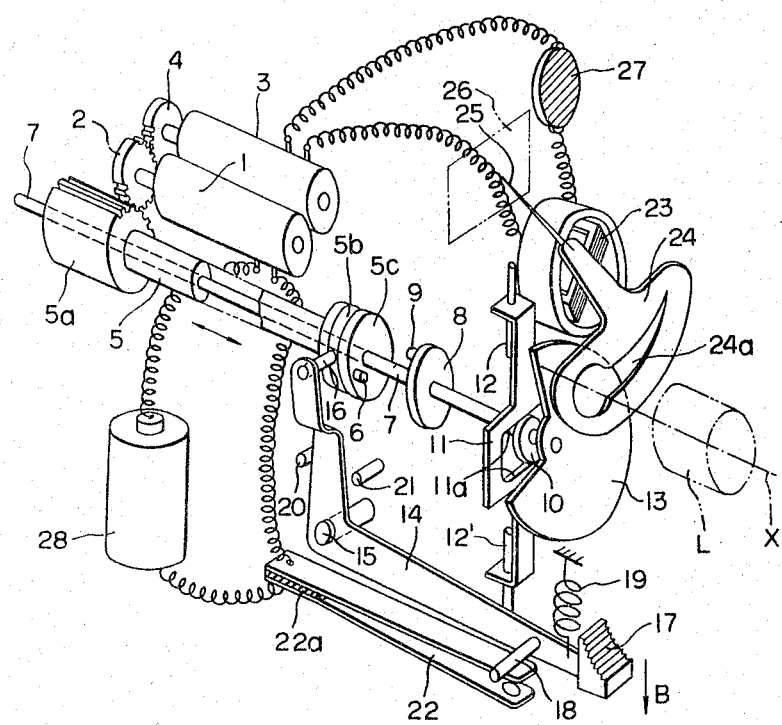
FIG. 1 is a simplified perspective view of the illustrative embodiment of the invention.

Referring to FIG. 1, a prime mover in the form of a constant speed motor 1 for film feed has a gear 2 fixed to an end of the shaft thereof. Gear 2 meshes with gear 4 fixed on the rotor of a D.C. generator 3 as well as with gear section 5a of slide 5 so as to transmit the rotation of motor 1 to D.C. generator 3 and slide 5. Generator 3 by its constant rotation produces electrical energy of a constant voltage which is fed to an exposure meter circuit shown in FIG. 2. Slide 5, which is provided with gear section 5a at its left end, has a peripheral groove 5b at its right and slidably rotates on shutter shaft 7.

Figure 3:
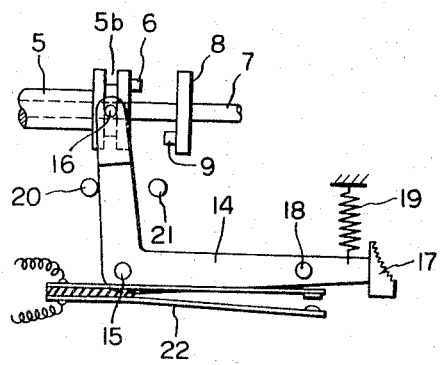
FIGS. 3 to 5 are perspective views of the clutch disc and other component members adjacent thereto; with FIG. 3 illustrating conditions prior to the start of the action of the release lever.
Figure 4:
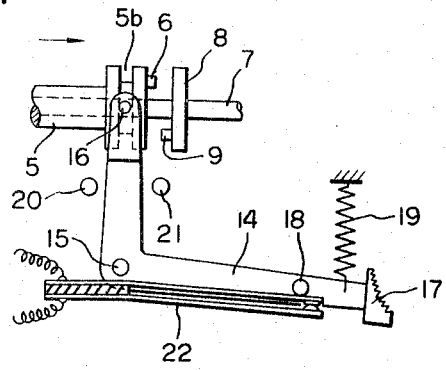
Figure 5:
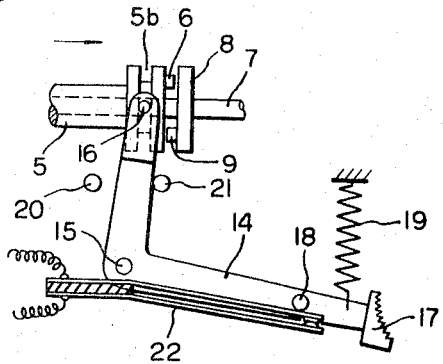

Gear section 5a is wide enough axially to assure transmission of the rotation of motor 1 thereto despite the axial movement of slide 5 on shutter shaft 7. Pin 6 mounted in and extending from the surface of disc 5c of slide 5, is eccentric with respect to the axis of rotation of the slide. Clutch disc 8 integrally rotates with shutter shaft 7 and has, on its surface of facing disc 5c, a pin 9, eccentric with respect to its axis of rotation, which engages with pin 6 of slide 5 as the latter approaches disc 8 to transmit the rotation of slide 5 to shutter shaft 7. Eccentric cam 10 integrally rotates with shutter shaft 7 and its peripheral surface engages the border of aperture or frame 11a of film feeder 11, one full rotation of cam 10 producing one full up and down reciprocating movement of the film feeder along guide pins 12 and 12', the movement being controlled by an unillustrated prior known means for a frame by frame supply of film. Rotary shutter 13 is rigidly fixed to the extremity of shutter shaft 7 so that a full single rotation completes one exposure action. Release lever 14 is pivotably supported on pivot 15 and constantly urged to turn anticlockwise by spring 19. It has a fixed coupling pin 16 at the free end of its vertical arm and a push button 17 affixed to the end of its horizontal arm 14 from an intermediate portion of which an electrically isolated pin 18 extends laterally to engage a switch 22, as will hereinafter appear. The coupling pin 16 will slide the slide 5 on shutter shaft 7 when release lever 14 is turned clockwise as illustrated in FIGS. 3 to 5. Stops 20 and 21 are provided for restricting release lever 14 to a definite range of pivoting. Switch 22 consists of a pair of conductive spring plates opposite to each other and the ends of which are rigidly fixed to each other at one end by an insulating spacer 22a. Switch 22 is closed by pin 18 projecting from lever 14 when lever 14 is pivoted to reach the midpoint between stops 20 and 21 defining its range of pivoting successive positions of the elements being illustrated in FIGS. 3 to 5, from which it will be noted that pivoting the lever beyond the midpoint results in a bending of the switch.

A moving coil galvanometer designated 23 has one of its terminals connected to D.C. generator 3 and the other to a photoelectric resistor 27 constituting a known exposure meter circuit. Diaphragm 24 is fixed on the shaft of galvanometer 23 and provided with an aperture 24a in the form substantially of a droplet of water in alignment with the image forming optical axis X to give a required aperture size for the objective L as exposure meter 23 operates. Pointer 25 integral with diaphragm 24 may be observed through finder frame or enclosure 26 and is so designed that the position of the indicator, upon proper and required exposure time length being measured, register with an exposure index (not shown) which is provided within finder enclosure 26. Accordingly, when the exposure conditions are improper, the photographer can observe it in the first stage of the action of the push button from the position of the indicator appearing in the finder enclosure and can avoid to proceed to the second stage of the action of the push button.

Figure 2:
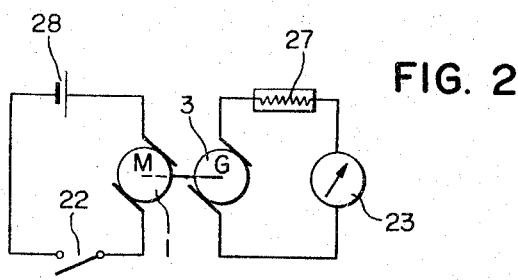
FIG. 2 is a diagram of the electrical circuit of the embodiment.

Photoelectric resistor 27 is of as CdS or material of similar characteristics, and has one of its terminals connected to generator 3 and other, as has been stated, to exposure meter 23. Source 28 for the motor circuit as illustrated in FIG. 2, has one of its terminals connected to one terminal of motor 1 and the other, through switch 22, to the other terminal of the motor 1.

In accordance with the invention, with the structural arrangement as described, when push button 17 is depressed in the direction arrow B in FIG. 1 for taking a picture, release lever 14 slides slide 5 to the right by pin 16 projecting from its vertical arm, and before slide 5 comes to engage with clutch disc 8, that is, pin 6 engages with pin 9, electrically isolated pin 18 in the horizontal arm of release lever 14 causes closure of switch 22 to complete the circuit energizing motor 1 to rotate it at a constant rate, this rotation being transmitted through gearings 2 and 4 to slide 5 and D.C. generator 3 but having no effect on shutter shaft 7. Accordingly, generator 3 starts to generate a prescribed voltage to energize the exposure meter circuit, but neither film feed nor shutter action takes place, since there is no rotation of clutch disc 8. This is the first stage.

When push button 17 is depressed still more against the bending pressure of switch 22, pin 16 functions to slide slide 5, which is rotating, further to the right to engage it by way of disc 5a with clutch disc 8 resulting in the rotation of motor 1 being transmitted to shutter shaft 7, and eccentric cam 10 and shutter 13 are actuated for starting taking a picture. This is the second stage. The two stages of push button 17 may be distinguished from each by feeling in the finger tips of the photographer by adjusting the bending pressure of switch 22, or, even more distinctively, by providing a known click stop mechanism. Motor 1 utilized in this embodiment of the invention may, of course, be a so-called spring motor, which, when preferred, may have its rotation mechanically started by means of, in place of switch 22, for example, a ratchet mechanism with a starter element.

Thus as described in detail, in accordance with the invention, necessary exposure conditions become known independently of the film feed, and the actuation of the film feed and making the exposure before the motor and the generator reach to their normal states, is avoided, so that waste of the film supply in starting motion picture camera operation is absolutely avoided.

What is claimed is:

1. In a motion picture camera including shutter means and an automatic exposure adjusting device, the combination comprising, a motor for driving the shutter means, a D.C. generator driven by said motor, a normally disengaged clutch interposed between the motor and the shutter means, a release button movable from an inoperative position through a first and a second position, a lever actuated by the release button for initiating operation of the motor to drive the generator when the release button is in its first position and for engaging the clutch mechanism to drive the shutter means when the release button is in its second position, and an electrical circuit for the automatic exposure adjusting device, the voltage developed by the generator forming the power source for said circuit.

2. The combination as set forth in claim 1, wherein the motor comprises a D.C. motor, a second electrical circuit for the D.C. motor including a voltage source and a normally open switch, and a pin on the release button actuated lever for closing the switch when the release button is in its first and second positions.

3. The combination as set forth in claim 1, wherein the clutch includes a slidable clutch member, a peripheral groove in the clutch member, a coupling pin affixed in the release button actuated lever registering in the peripheral groove to slide the clutch member to engage the clutch when the release button is in its second position.

4. The combination as set forth in claim 1, wherein the automatic exposure adjusting device includes a photoelectric resistor and a galvanometer in the electrical circuit, a diaphragm plate movable by the galvanometer and having an aperture coincident with the optical axis of the camera for varying the exposure aperture, and a pointer movable by the galvanometer and viewable in the camera viewfinder.

5. The combination as set forth in claim 2, wherein the automatic exposure adjusting device includes a photoelectric resistor and a galvanometer in the first said electrical circuit, a diaphragm plate movable by the galvanometer and having an aperture coincident with the optical axis of the camera for varying the exposure aperture, and a pointer movable by the galvanometer and viewable in the camera viewfinder.

6. The combination as set forth in claim 3, wherein the automatic exposure adjusting device includes a photoelectric resistor and a galvanometer in the electrical circuit, a diaphragm plate movable by the galvanometer and having an aperture coincident with the optical axis of the camera for varying the exposure aperture, and a pointer movable by the galvanometer and viewable in the camera viewfinder.

References Cited by the Examiner
UNITED STATES PATENTS
3,085,487  4/1963  Akahane _____ 352—141
3,186,319  6/1965  Hochstein _____ 352—178 X JULIA E. COINER, *Primary Examiner.*

NORTON ANSHER, *Examiner.*

H. H. FLANDERS, *Assistant Examiner.*